United States Patent [19]

Okita et al.

[11] Patent Number: 4,576,866

[45] Date of Patent: Mar. 18, 1986

[54] MAGNETIC RECORDING MATERIAL

[75] Inventors: Tsutomu Okita; Nobuo Tsuji; Yoshito Mukaida, all of Kanagawa, Japan

[73] Assignee: Fuji Photo Film Co., Ltd., Kanagawa, Japan

[21] Appl. No.: 592,671

[22] Filed: Mar. 23, 1984

[30] Foreign Application Priority Data

Mar. 25, 1983 [JP] Japan .................................. 58-48761

[51] Int. Cl.$^4$ ............................................. G11B 5/70
[52] U.S. Cl. .................... 428/336; 252/62.54; 360/134; 360/135; 360/136; 427/44; 428/425.9; 428/522; 428/694; 428/900
[58] Field of Search ............. 428/694, 695, 425.9, 428/900, 522, 336; 427/44, 130; 360/134–136; 252/62.54

[56] References Cited

U.S. PATENT DOCUMENTS

| | | | |
|---|---|---|---|
| 4,004,997 | 1/1977 | Tsukamoto | 428/458 |
| 4,407,853 | 10/1983 | Okita | 427/130 |
| 4,428,974 | 1/1984 | Okita | 427/130 |
| 4,448,846 | 5/1984 | Chang | 428/412 |
| 4,448,848 | 5/1984 | Okita | 428/447 |

FOREIGN PATENT DOCUMENTS 128711 10/1982 Japan .
2055877 3/1981 United Kingdom .

*Primary Examiner*—Ellis P. Robinson
*Attorney, Agent, or Firm*—Sughrue, Mion, Zinn, Macpeak, and Seas

[57] ABSTRACT

There is provided a magnetic recording material which comprises a support and a magnetic layer coated thereon. The magnetic layer contains as its binder, a combination of at least one vinyl chloride-vinyl acetate-based copolymer characterized by its —$CO_2H$ content or cellulose dinitrate, at least one urethane acrylate having a particular chemical structure, and at least one low molecular weight compound having two or more acryloyl or methacryloyl groups. The magnetic layer is hardened by beam irradiation. Thus, marked increase in dispersibility of ferromagnetic powders, improvement in electromagnetic transformation characteristics and sharp increase in durability are attained.

8 Claims, No Drawings

MAGNETIC RECORDING MATERIAL

FIELD OF THE INVENTION

The present invention relates to a magnetic recording material, such as a video tape, an audio tape, a computer tape or the like. More specifically, the invention relates to such a material which includes a binder curable by irradiation with electron beams.

BACKGROUND OF THE INVENTION

There is a method which has been prevailingly applied to magnetic recording materials, wherein thermoplastic resins, such as vinyl chloride-vinyl acetate resins, vinyl chloride-vinylidene chloride resins, cellulose resins, acetal resins, urethane resins, acrylonitril-butadiene resins and so on, are employed as their respective binders independently or in combination of two or more thereof, as described in U.S. Pat. Nos. 4,068,040, 3,242,005, 4,352,859, 3,840,400, 4,115,290, 3,681,137, 3,781,210, 4,049,566, 4,336,308, 4,049,871, 4,361,627 and 3,262,813. However, such a method has the defect that sufficient abrasion resistance cannot be imparted to a magnetic layer and thereby, the running course of magnetic tapes is stained.

Further, there have been known a method of utilizing thermosetting resins such as melamine resins, urea resins and the like, and a method of using composition prepared by adding to the aforementioned thermoplastic resins such binders as to undergo chemically a cross-linking reaction, e.g., isocyanate compounds, epoxy compounds or the like. However, these methods suffer from (1) the defect that use of cross-linking binders causes lowering of storage stability of the resinous solution in which a magnetic substance is dispersed, that is, shortening of the pot life of the magnetic coating, which makes it impossible to maintain uniformity of the physical properties of the magnetic coating and in its turn the homogeniety of the magnetic tape, and (2) after coating and drying, a heat processing step is required to harden the coat and therefore, it takes a lot of time to produce finished goods.

With the invention of obviating the above-described defects, methods of producing magnetic recording materials in which acrylic acid ester oligomers and monomers are employed as a binder with or without thermoplastic resins and wherein the setting thereof is carried out by irradiation with electron beams are disclosed in Japanese Patent Publication No. 12423/'72; Japanese Patent Application (OPI) Nos. 15104/'72, 77433/'75, 86130/'82 and 127926/'82; U.S. Pat. No. 3,871,908; and British Patents 2,055,877-B and 2,084,589. However, such methods have failed in ensuring a high state of electromagnetic properties and a high degree of durability to magnetic recording materials.

Recently, high state of electromagnetic properties have been required in particular for magnetic recording materials. Consequently, improvement in the dispersibility of ferromagnetic fine powders has become a more pressing need. Poor dispersibility of ferromagnetic fine powders causes lowering of output, and is responsible for noise.

In addition, using a thin support in a magnetic tape is required for making it possible to record thereon for a long time and improvements in mechanical properties of magnetic layer to be used are required for the purpose since, e.g., in case of video tapes, the latest polyfunctional video cassette recorders call for running of magnetic tapes under severe conditions. However, it was impossible to impact such properties as to fullfil both the requirements to the magnetic layer.

SUMMARY OF THE INVENTION

As a result of our extensive studies on improvement in conventional techniques, such as the method of using thermoplastic or thermosetting resins, the method of adding chemically cross-linking binders, the method of using binders capable of being hardened through the cross-linking reaction caused by irradiation with electron beams, and so on, the present invention has been achieved.

A primary object of the present invention is to provide a magnetic recording material excellent in electromagnetic properties.

Another object of the present invention is to provide a magnetic recording material having a magnetic layer excellent in durability.

A further object of the present invention is to provide a magnetic recording material which is produced using a magnetic coating composition excellent in storage stability and therefore, capable of being homogeneously maintained.

A still further object of the present invention is to provide a magnetic recording material which does not require any heat processing step for hardening the coat.

The above-described objects are attained with a magnetic recording material which comprises a support having provided thereon, a magnetic layer containing as its binder a combination of at least one compound selected from the class (A) described below, at least one compound selected from the class (B) described below and at least one compound selected from the class (C) described below and having been irradiated with electron beams;

Class (A) Vinyl chloride-vinyl acetate-based copolymers containing $5 \times 10^{-5}$ to $1.7 \times 10^{-3}$ equivalent of —$CO_2H$ group per 1 g of copolymer, and cellulose dinitrate.

Class (B) Urethane acrylates having two or more of acryloyl group or methacryloyl groups per molecule, with the urethane being synthesized using as one of the starting materials a polyester polyol which contains a polyhydric alcohol component and a polybasic component, wherein at least 50 mole % of the polyhydric alcohol component is selected from the group consisting of dihydric alcohols of the group (I), and/or at least 50 mole % of the polybasic acid component is selected from the group consisting of bibasic acids of the group (II):

Group (I): alkyl-substituted aliphatic dihydric alcohols, alicyclic dihydric alcohols, and dihydric alcohols made by addition of alkylene oxide to alicyclic or aromatic dihydric alcohols.

Group (II): Alicyclic dicarboxylic acid, and aromatic dicarboxylic acids.

Class (C) Compounds having a molecular weight of 500 or less and containing two or more of acryloyl group or methacryloyl groups per molecule.

That is, the present invention is characterized by using as a binder combination of a particular vinyl chloride-vinyl acetate-based copolymer cellulose dinitrate, a urethane acrylate having a particular chemical structure and an acrylate series low molecular weight compound and further, by setting the binder through irradiation with electron beams, which brings about a striking increase in the dispersibility of a ferromagnetic fine powder, an improvement in electromagnetic properties and further, a sharp increase in durability.

DETAILED DESCRIPTION OF THE INVENTION

Specific examples of the compounds belonging to the class (A) include vinyl chloride-vinyl acetate-maleic acid copolymers, vinyl chloride-vinyl acetate-fumaric acid copolymers, vinyl chloride-vinyl propionate-maleic acid copolymers, vinyl chloride-vinyl acetate-vinyl alcohol-maleic acid copolymers, cellulose dinitrate and the like. Especially favourable compounds are vinyl chloride-vinyl acetate-maleic acid copolymers and cellulose dinitrate. For the vinyl chloride-vinyl acetate-based copolymers, it is desirable to contain $5 \times 10^{-5}$ to $1.7 \times 10^{-3}$, preferably $3 \times 10^{-4}$ to $1 \times 10^{-3}$, more preferably $3 \times 10^{-4}$ to $5 \times 10^{-4}$, equivalent of —$CO_2H$ group per 1 g of copolymer. If the content of —$CO_2H$ group deviates from the above-described range, the dispersibility of ferromagnetic powder becomes poor and electromagnetic properties are markedly deteriorated.

Urethane acrylates which are the compounds belong to the class (B) are obtained by reacting a hydroxyl group-containing (meth)acrylate, a polyisocyanate and a polyester polyol with one another. The reaction is run under a condition at a temperature of from 40° C. to 100° C., preferably from 60° C. to 90° C., in such a manner that firstly the polyester poloyl is added to the polyisocyanate continuously, intermittently or collectively to react with each other and then, the hydroxyl group-containing (meth)acrylate is added thereto continuously, intermittently or collectively to complete the reaction; or in such a manner that the hydroxyl group-containing (meth)acrylate is firstly added to the polyisocyanate continuously, intermittently or collectively to react with each other and then, the polyester polyol is further added thereto continuously, intermittently or collectively to complete the reaction.

Therein, intermittent addition is employed to greater advantage for easy control of the reaction and working facility.

Upon the reaction, it is desirable to prepare the reacting species in such amounts that the number of moles of isocyanate group in the polyisocyanate may be equal to the sum of the numbers of moles of hydroxyl group in the hydroxyl group-containing (meth)acrylate and in the polyester polyol, though it is possible to prepare excess of isocyanate group over hydroxyl group within the range of 10 mole %, or vice versa.

A preferable number average molecular weight of the urethane acrylate ranges from 500 to 100,000, particularly preferably from 1,000 to 20,000.

If the molecular weight is less than 500, the magnetic layer of the magnetic recording material obtained becomes too hard and consequently, it is apt to be cracked by bending, and the magnetic recording material tends to curl due to shrinkage attended by setting of the urethane acrylate after electron beam irradiation. On the other hand, if the moleculr weight is more than 100,000, solubilities of the uretane acrylates to solvents tend to become poor and therefore, the urethane acrylate becomes difficult to handle, and what is worse the (meth)acryloyl group concentration becomes low causing a slowdown of the setting speed and in its turn adversely effecting the producing speed.

A suitable polyester polyol to constitute the urethane acrylate of the present invention is one which contains as its polyhydric alcohol component one or more of a dihydric alcohol selected from the group (I) described below in a fraction of 50 mole % or more, preferably 70 mole % or more, and/or as its polybasic acid component one or more of a dibasic acid selected from the group (II) described below in a fraction of 50 mole % or more, preferably 70 mole % or more, and which preferably has a number average molecular weight ranging from 200 to 50,000, more preferably from 500 to 20,000:

Group (I); Alkyl-substituted aliphatic dihydric alcohols preferably having up to 14 carbon atoms (including the carbon atoms of the alkyl group) wherein the alkyl group has preferably up to 6 carbon atoms, alicyclic dihydric alcohols preferably having up to 20 carbon atoms, and dihydric alcohols preferably having up to 24 carbon atoms, formed by addition of alkylene oxides preferably having up to 4 carbon atoms to alicyclic or aromatic dihydric alcohols.

Group (II); Alicyclic dicarboxylic acids preferably having up to 16 carbon atoms and aromatic dicarboxylic acids preferably having up to 16 carbon atoms.

Specific examples of the dihydric alcohols which belong to the group (I) include 2,2-dimethylpropane-1,3-diol, 2,2-diethylpropane-1,3-diol, 2-n-butyl-2-ethylpropane-1,3-diol, propane-1,2-diol, butane-2,3-diol, 2-ethylbutane-1,4-diol, 2-methylpentane-2,4-diol, 3-methylpentane-2,4-diol, 2,2,4-trimethylpentane-1,3-diol, 2,5-dihydroxyhexene-3, cyclohexane-1,2-diol, cyclohexane-1,3-diol, cyclohexane-1,4-diol, cyclohexane-1,4-dimethanol, cyclohexane-1,3-dimethanol, 2,2,4,4-tetramethylcyclobutane-1,3-diol, 1,4-di(hydroxethoxy)cyclohexane, 2,2-bis(4-hydroxycyclohexyl)propane, bis(4-hydroxycyclohexyl)methane, 2,2-bis(4-hydroxyethoxycycohexyl)propane, 2,2-bis(4-hydroxyethoxy-phenyl)propane, 2,2-bis(4-hydroxyethoxyethoxy-phenyl)propane, 2,2-bis(4-hydroxyethoxy-phenyl)methane, and 2,2-bis(4-hydroxyethoxyethoxy-phenyl)methane. Of these 2,2-dimethylpropane-1,3-diol and 2-methylpentane-2,4-diol are particularly preferred.

Specific examples of the dibasic acids which belong to the group (II) include hexahydrophthalic acid, tetrahydrophthalic acid, 1-carboxylate-7-methylene-carboxylatenorbornane, 2,6-dicarboxylate-14H-naphthalene, phthalic acid, isophthalic acid, terephthalic acid, naphthalenedicarboxylic acid, bis-methylenecarboxylatebenzene, p,p'-biphenyldicarboxylate, 2,2'-bis(4-carboxyphenyl)propane, 3,6-endomethylene-1,2,3,6-tetrahydrophthalic acid, het acid, the acid anhydrides thereof, the acid chlorides thereof and the dialkyl esters (e.g., dimethyl ester, diethyl ester, etc.) thereof. Of these, isophthalic acid, phthalic acid and tetrahydrophthalic acid are particularly preferred.

Examples of dihydric alcohols other than those belonging to the group (I), which make up the above-described polyester polyol, include the dihydric alcohols set forth below. These alcohols may be used in a fraction of less than 50 mole %. Further, when synthesizing polyester polyols having 3 or more of hydroxyl groups, polyhydric (trihydric or above) alcohols set forth below can be used in a fraction of 10 mole % or less.

Specific examples of the dihydric alcohols which can be used include ethylene glycol, trimethylene glycol, tetramethylene glycol, pentamethylene glycol, hexamethylene glycol, heptamethylene glycol, octamethylene glycol, nonamethylene glycol, decamethylene glycol, diethylene glycol, triethylene glycol, and tetraethylene glycol. Ethylene glycol and trimethylene glycol are generally used in practice.

Specific examples of polyhydric alcohols over trihydric ones which can be used include glycerine, trimethylolmethane trimethylolethane, trimethylolpropane, hexane-1,2,6-triol, tris(2-hydroxyethyl)isocyanurate, pentaerythritol, sorbitol, and erythritol. Trimethylolpropane is generally used in practice.

Examples of dibasic acids other than those belonging to the group (II), which make up the above-described polyester polyol, include the dibasic acids set forth below. These acids may be used in a fraction of less than 50 mole %. Further, when synthesizing polester polyols having 3 or more of hydroxyl groups, polybasic acids over tribasic ones as described below can be used in a fraction of 10 mole % or less.

Specific examples of the dibasic acids which can be used include oxalic acid, malonic acid, succinic acid, glutaric acid, adipic acid, sebacic acid, docedane-2 acid, maleic acid, fumaric acid, itaconic acid, trimethyladipic acid, methyleneglutaric acid, ethylmalonic acid, methylmaleic acid, methylfumaric acid, and the acid anhydrides thereof, the acid chlorides thereof and the dialkyl esters (e.g., dimethyl ester, diethyl ester, etc.) thereof. In general, adipic acid and sebacic acid are used.

Specific examples of the polybasic acids over tribasic ones which can be used include trimellitic acid, methylcyclohexenetricarboxylic acid, aconitic acid, butanetricarboxylic acid, butenetricarboxylic acid, tris(2-carboxylethyl)isocyanurate, pyromellitic acid, the acid anhydrides thereof, the acid chlorides thereof, and the alkyl esters thereof. Trimellitic acid is usually used.

The polyester polyols can be obtained by preparing the above-described polyhydric alcohols and polybasic acids in a reactor and allowing them to undergo esterification via dehydration, or by heating low molecular weight polyester polyols, which have been obtained by dehydrating esterification, under reduced pressure to cause dealcoholation (vacuum polcondensation).

It is desirable to react the polyhydric alcohols and the polybasic acids in such amounts that all of the end groups of the polyester polyol to be obtained by dehydrating esterification may become hydroxyl groups.

More specifically, a polyester polyol having a condensation degree of n is synthesized by the dehydrating esterification reaction of n+1 moles of dihydric alcohol and n moles of dibasic acid. The molar ratio of dihydric alcohol to dibasic acid is preferably from 1.5/1 to 1.8/1.

Suitable examples of polyisocyanates making up the urethane acrylates which can be employed in the present invention include tolylene diisocyanate, diphenylmethane-4,4'-diisocyanate, naphthalene diisocyanate, tolidine diisocyanate, hexamethylene diisocyanate, isophorone diisocyanate, xylene diisocyanate, dicyclohexylmethane-4,4'-diisocyanate, lysine diisocyanate, polymeric isocyanates such as polymethylene polyphenylisocyanate, etc., and adducts of polyols and diisocyanates such as 1:3 adduct of trimethylolpropane and tolylene diisocyanate, etc. Of these, tolylene diisocyanate, diphenylmethane diisocyanate, hexamethylene diisocyanate and isophorone diisocyanate are preferred.

Suitable examples of hydroxyl group-containing (methy)acrylates making up the urethane acrylates which can be used in the present invention include 2-hydroxylethyl (meth)acrylate, 2-hydroxypropyl (methy)acrylate, 3-hydroxypropyl (meth)acrylate, 2-hydroxy-3-phenoxypropyl (meth)acrylate, diethylene glycol mono(meth)acrylate, triethylene glycol mono(meth)acrylate, tetraethylene glycol mono(meth)acrylate, 2-hydroxy-3-butoxypropyl (meth)acrylate, and so on. Of these, 2-hydroxyethyl (meth)acrylate and 2-hydroxypropyl.

Specific examples of the compounds belonging to the class (C) include polyacrylic and polymethacrylic acid esters of polyhydric alcohols such as ethylene glycol, diethylene glycol, triethylene glycol, tetraethylene glycol, other polyethylene glycols, butanediol, hexanediol, octanediol, trimethylolpropane, glycerol, pentaerythritol, dipentaerythritol, cyclohexanediol, cyclohexane-1,4-dimethanol, 2,5-dihydroxytoluene, p,p'-biphenol, 2,2'-bis(4-hydroxyethoxyphenyl)propane, 2,2'-bis(4-hydroxypolyethoxyphenyl) propane, etc., with the esters having a molecular weight of 500 or less. Of these, diethylene glycol diacrylate, triethylene glycol triacrylate, trimethylolpropane triacrylate, cyclohexane diacrylate and dipentaerythritol tetraacrylate are particularly preferred. If these compounds have a molecular weight of not less than 500, they are undesirable since they cause a decrease in the cross-linking degree after electron-beam irradiation. These compounds belonging to the class (C) can be employed in the form of mixture of two or more thereof.

A preferable range of the weight ratio of the compounds belonging to the class (B) to the compounds belonging to the class (C) in the binder composition is from 40/60 to 95/5, particularly preferably from 50/50 to 85/15.

A preferable range of the weight ratio of the compounds belonging to the class (A) to the total of the compounds belonging to the class (B) and the class (C) is from 30/70 to 80/20, particularly preferably from 40/60 to 70/30.

If the fraction of the compounds of class (A) is smaller than the above-described ratio, the dispersibility of magnetic substances in the resulting binder becomes poor, whereas if it is greater than the above-described ratio, durability of the resulting magnetic layer is deteriorated. On the other hand, if the fraction of the compounds of the class (B) is smaller than the above-described ratio, or if the fraction of the compounds of the class (C) is greater than the above-described ratio, the durability is deteriorated, whereas if the fraction of the compounds of the class (B) is greater than the above-described ratio, or if that of the compounds of the class (C) is smaller than the above-described ratio, the coated layer does not hardened well and consequently, insufficient durability is obtained.

Examples of ferromagnetic powders which can be used in the present invention include ferromagnetic iron oxide fine powder, Co-doped ferromagnetic iron oxide fine powder, ferromagnetic chromium dioxide powder, ferromagnetic alloy fine powder, barium ferrite, etc. The above-described ferromagnetic iron oxide and ferromagnetic chromium dioxide particles preferably have an axial ratio of about 2:1 to 20:1, particularly 5:1 to above, and an average length in the range of about 0.2 to about 2.0 $\mu$m. The above-described ferromagnetic alloy powder is one which contains a metal component in a proportion of about 75 wt % or more, with about 80 wt % or more of the metal component being at least one ferromagnetic metal (e.g., Fe, Co, Ni, Fe-Co, Fe-Ni, Co-Ni or Fe-Co-Ni) and the particle length is about 1.0 $\mu$m or less. The ferromagnetic powders are generally used in an amount of 2 to 7 parts by weight, preferably 3 to 6 parts by weight per part by weight of the total binder components.

The magnetic coating composition to be employed in the present invention may contain organic solvents. The solvent is generally used in an amount of 2 to 8 times the total weight of binder components used. Such organic solvents can be selected properly from ketones such as acetone, methyl ethyl ketone, methyl isobutyl ketone, cyclohexanone, etc.; esters such as methyl acetate, ethyl acetate, butyl acetate, ethyl lactate, glycol acetate monoethyl ether, etc.; glycol ethers such as ether, glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, ethylene chlorhydrin, dichlorobenzene, etc.; and so on.

In addition, the magnetic coating composition to be employed in the present invention may contain as additives a lubricant, an abrasive, a rust preventive, an antistatic agent and so on. Useful lubricants include saturated or unsaturated higher fatty acids, fatty acid esters, higher fatty acid amides, higher alcohols, silicone oils, mineral oils, vegetable oils, fluorine-containing compounds and the like. These lubricants may be added to the magnetic coating composition at the time of preparation thereof, or they may be coated or sprayed on the surface of the magnetic layer in a form of solution in an organic solvent or in their original condition after drying the magnetic layer, the processing of surface-smoothening the magnetic layer, or the processing of hardening the magnetic layer by electron-beam irradiation.

Suitable materials which can be used for mon-magnetic support on which the magnetic coating composition is to be coated include polyesters such as polyethylene terephthalate, polyethylene 2,6-napthalate, etc.; polyolefins such as polyethylene, polypropylene, etc.; cellulose derivatives such as cellulose triacetate, etc.; other synthetics such as polycarbonate, polyimide, polyamideimide, etc.; and depending on the usage, non-magnetic metals such as Al, Co, Sn, Zn, etc.; and papers such as paper, polyolefin-coated or -laminated paper, etc.

The non-magnetic support may be in any form, e.g., a film, a tape, a sheet, a disc, a card, a drum, etc., and various mateirals are appropriately selected depending on the form employed.

In addition, the non-magnetic support may be back-coated (i.e., coated with a backing layer) on the side opposite the magnetic layer for the purposes of preventing generation of static charges, transfer or wow and flutter, improving the strength of the manetic recording material, and matting the back side thereof.

Electron-beam accelerators which can be employed in the present invention include those of scanning type, double scanning type, curtain beam type, and broad beam curtain type.

It is to be desired for characteristics of electron beams that the above-described electron-beam accelerators should be used under such a condition that an acceleration voltage ranges from 100 to 1,000 kV, preferably 150 to 300 kV, and an absorption dose may be controlled to the range of 0.5 to 20 megarad, preferably 3 to 15 magarad. If the acceleration voltage is less than 100 kV, insufficiency of permeation energy is brought about, whereas if it is increased beyond 1,000 kV, energy efficiency in using for polymerization is decreased, and it is uneconomical to set the acceleration voltage to such high values. On the other hand, if the absorption dose is less than 0.5 magarad, the setting reaction is incomplete and therefore, the strength of the resulting magnetic layer becomes insufficient, whereas if it is increased beyond 20 megarad, energy efficiency used for setting is decreased and further, the irradiated material becomes hot. Such an exothermic phenomenon is undesirable especially for plastic supports because they are deformed thereby.

There is no particular limitation on the thickness of the magnetic layer of the present invention, but it is generally from 2 to 8 $\mu$m, preferably 3 to 6 $\mu$m.

The magnetic recording material of the present invention has been found to have excellent electromagnetic properties and high abrasion resistance, and to make the heat treatment step for hardening the coated layer unnecessary by virtue of adoption of electron-beam irradiation. It has also been found that the dispersibility of magnetic powders in magnetic coating composition is improved, and the magnetic coating compositions have excellent storage stability.

The present invention will now be illustrated in more detail by reference to the following reference examples, examples and comparative examples. Additionally, in the following reference examples, examples and comparative examples, all parts are by weight unless otherwise indicated. The scope of the invention is not limited to these Examples.

REFERENCE EXAMPLE 1

438 g (3 moles) of adipic acid and 416 g (4 moles) of neopentyl glycol were placed in a 2-liter flask, and heated to 180° C. and stirred as nitrogen gas was passed therethrough, thus achieving dehydrating esterification to obtain polyneopentyladipate having a mean molecular weight of 746.

Next, 278 g (1.6 moles) of tolylene diisocyanate was placed in a 1-liter flask wherein the atmosphere had been replaced with $N_2$, and heated to 70° C. Holding the temperature inside the flask at 70° C., 597 g (0.8 mole) of the neopentyladipate obtained above was added intermittently thereto by 64 g portion each for about 10 times and further thereto, 186 g (1.6 moles) of 2-hydroxyethyl acrylate was also added intermittently by 37 g portion each for 5 times. Heating and stirring were continued at 70° C. for an additional 2 hours. Thus, viscous urethane acrylate was obtained.

The urethane acrylate obtained has a mean molecular weight of 1,300 and contained, on the average, two acryloyl group per molecule.

REFERENCE EXAMPLE 2

332 g (2 moles) of isophthalic acid and 270 g (3 moles) of tetramethylene glycol were placed in a 1-liter flask, and heated to 180° C. with stirring as nitrogen gas was passed therethrough. Holding these conditions, dehydrating esterification was accomplished in 8 hours. Then, 0.6 (0.1 wt %) of tetrabutyl titanate (abbreviated as "TBT" hereinafter) was added as a catalyst to the ester obtained above, and the resulting system was heated up to 200° to 250° C. under reduced pressure of 2 mm Hg and kept there for 6 hours to effect vacuum polycondensation and consequently, to allow 72 g (0.8 mole) of tetramethylene glycol to effuse. Thus, polyester polyol having a mean molecular weight of 2,290 was obtained.

Next, 52.2 g (0.3 mole) of tolylene diisocyanate and 533 g of methyl ethyl ketone were placed in a 2-liter flask wherein the atmosphere had been replaced with dried nitrogen gas, and heated to 70° C. 458 g (0.2 mole) of the polyester polyol obtained above was fused by heating, and added intermittently in five parts to the resulting solution as the temperature of the reaction system was kept at 70° C. Further, thereto, 23.2 g (0.2 mole) of 2-hydroxyethyl acrylate was added intermittently in two parts. Heating was continued for an additional two hours with stirring so as to keep the temperature at 70° C. Thus, a 50% methyl ethyl ketone solution of an urethane acrylate was obtained.

The urethane acrylate obtained had a mean molecular weight of 5,334 and two acrylol groups per molecule.

REFERENCE EXAMPLE 3

296 g (2 moles) of orthophthalic acid anhydride, 156 g (1.5 moles) of neopentyl glycol and 93 g (1.5 moles) of ethylene glycol were placed in a 1-liter flask, and heated to 180° C. with stirring as nitrogen gas was passed therethrough. Holding these conditions, dehydrating esterification was accomplished in 6 hours. Then, 0.5 g (0.1 wt %) of TBT was added as a catalyst to the ester obtained above, and the resulting system was heated up to 200° to 250° C. under reduced pressure of 2 mm Hg and kept there for 4 hours to effect vacuum polycondensation and as a result thereof, to allow 54 g of glycolic component to effuse. Thus, polyester polyol having a hydroxyl group value of 0.9 meg (miliequivalent) per gram, and a mean molecular weight of 2,200 was obtained.

Next, 53.4 g (0.24 mole) of isophorone diisocyanate and 501 g of methyl ethyl ketone were placed in a 2-liter flask wherein the atmosphere had been replaced with dried nitrogen gas, and heated to 70° C. 440 g (0.2 mole) of the polyester polyol obtained above was heated, and added intermittently in five parts to the resulting solution as the reaction system was kept at 70° C. Further thereto, 7.7 g (0.07 mole) of 2-hydroxyethyl acrylate was added in two parts. Heating was continued for an additional 3 hours with stirring so as to kept the reaction system at 70° C. Thus, a 50% methyl ethyl ketone solution of an urethane acrylate was obtained.

The urethane acrylate obtained had a mean molecular weight of 14,500 and two acryloyl groups per molecule.

REFERENCE EXAMPLES 4 and 8

Urethane acrylates were obtained using starting materials set for in Table 1 in the same manner as employed in Reference Example 1 (called "Synthesis Method I").

REFERENCE EXAMPLES 5 and 9

Urethane acrylates were obtained using starting materials set forth in Table 1 in the same manner as employed in Reference Example 2 (called "Synthesis Method II").

REFERENCE EXAMPLES 6 and 7

Urethane acrylates were obtained using starting materials set forth in Table 1 in the same manner as employed in Reference Example 3 (called "Synthesis Method III").

TABLE 1

| | Synthesis of Polyester Polyol | | | | | | Synthesis of Urethane Acrylate |
|---|---|---|---|---|---|---|---|
| | Polyhydric Alcohol | | Polybasic Acid | | | | Polyester |
| Reference Example No. | Kind | Amt. Added (mol.) | Kind | Amt. Added (mol.) | Synthesis Method | Number Averaged Mol. Wt. | Polyol Amt. Added (mol.) |
| 4 | 2,4-Dihydroxy-2-methylpentane | 4 | Adipic Acid | 3 | I | 798 | 0.5 |
| 5 | Tetramethylene Glycol | 3 | Hexahydrophthalic Acid Anhydride | 2 | II | 2500 | 0.15 |
| 6 | Cyclohexane-1,2-diol | 2 | Adipic Acid | 2 | III | 4000 | 0.1 |
| | Ethylene Glycol | 1 | | | | | |
| 7 | 2,2-(4-hydroxyethoxyphenyl)propane | 2 | Tetrahydrophthalic Acid | 1 | III | 2500 | 0.2 |
| | Ethylene Glycol | 1 | Sebacid Acid | | | | |
| 8 | Tetramethylene Glycol | 4 | Adipic Acid | 3 | I | 690 | 0.5 |
| 9 | Ethylene Glycol | 3 | Sebacic Acid | 2 | II | 2000 | 0.2 |

| | Synthesis of Urethane Acrylate | | | | | |
|---|---|---|---|---|---|---|
| | Polyisocyanate | | Hydroxyl-contg. (Meth)acrylate | | Urethane Acrylate | |
| Reference Example No. | Kind | Amt. Added (mol.) | Kind | Amt. Added (mol.) | Number Average Mol. Wt. | Number of Acryloyl per Molecule |
| 4 | Tolylene Diisocyanate | 1 | 2-Hydroxyethyl Acrylate | 1 | 1400 | 2 |
| 5 | Tolylene Diisocyanate | 0.3 | 2-Hydroxyethyl Acrylate | 0.3 | 3000 | 2 |
| 6 | Hexamethylene Diisocyanate | 0.2 | 2-Hydroxyethyl Acrylate | 0.2 | 4600 | 2 |
| 7 | Diphenylmethan Diisocyanate | 0.3 | 2-Hydroxyethyl Acrylate | 0.2 | 6000 | 2 |
| 8 | Tolylene Diisocyanate | 1 | 2-Hydroxyethyl Acrylate | 1 | 1300 | 2 |
| 9 | Tolylene | 0.1 | 2-Hydroxyethyl | 0.4 | 2600 | 2 |

TABLE 1-continued

| Diisocyanate | Acrylate |
|---|---|

EXAMPLE 1

| Magnetic Coating Composition | Parts |
|---|---|
| $\gamma$-Fe$_2$O$_3$ | 400 |
| Vinyl chloride-vinyl acetate-maleic acid copolymer (—CO$_2$H content $3 \times 4^{-4}$ equivalent per 1 g copolymer) | 50 |
| Urethane acrylate obtained in Reference Example 1 | 42 |
| Diethylene glycol diacrylate | 8 |
| Lecithin | 4 |
| Stearic acid | 4 |
| Butyl stearate | 4 |
| Carbon black | 10 |
| Al$_2$O$_3$ | 4 |
| Methyl ethyl ketone | 1000 |

The above-described composition was placed in a ball mill, and kneaded and dispersed for 50 hours. This magnetic coating composition was coated on a 15μ-thick polyethylene terephtalate film in a dry thickness of 5μ using a doctor blade. The coating was oriented using a cobalt magnet, and dried to remove the solvent therefrom (for 1 minute at 100° C.). Then, it was subjected to the surface-smoothening processing using 5-stage calendering which comprised passing the magnetic material between a group of two rolls of a cotton roll and a specular surface roll (roll temperature: 60° C.).

Next, the thus processed magnetic recording material was irradiated with electron beams having a beam current of 10 mA at the acceleration voltage of 200 kV such that the absorption dose went up to 10 Mrad. The resulting magnetic recording material was named Sample No. 1.

Samples were obtained using the same magnetic coating compositions as employed in Example 1 except that the binder of Example 1 was changed as follows, and the resulting magnetic recording materials were subjected to the same processings as in Example 1.

| Binder Composition | Parts |
|---|---|
| Comparative Example 1 (Sample No. 2) | |
| Vinyl chloride-vinyl acetate-maleic acid copolymer as employed in Example 1 | 50 |
| Urethane acrylate of Reference Example 8 | 42 |
| Diethylene glycol diacrylate | 8 |
| Comparative Example 2 (Sample No. 3) | |
| Vinyl chloride-vinyl acetate-maleic acid copolymer as employed in Example 1 | 50 |
| Urethane acrylate of Reference Example 9 | 42 |
| Tetramethylolmethane triacrylate | 8 |
| Comparative Example 3 (Sample No. 4) | |
| Urethane acrylate of Reference Example 1 | 85 |
| Trimethylolmethane triacrylate | 15 |
| Comparative Example 4 (Sample No. 5) | |
| Vinyl chloride-vinyl acetate-maleic acid copolymer as employed in Example 1 | 80 |
| Trimethylolmethane triacrylate | 20 |
| Comparative Example 5 (Sample No. 6) | |
| Vinyl chloride-vinyl acetate-maleic acid copolymer (—CO$_2$H content: $2 \times 10^{-3}$) equivalent per 1 g copolymer) | 50 |
| Urethane acrylate of Reference Example 1 | 42 |
| Diethylene glycol diacrylate | 8 |
| Example 2 (Sample No. 7) | |
| Vinyl chloride-vinyl acetate-maleic acid copolymer as employed in Example 1 | 30 |
| Urethane acrylate of Reference Example 2 | 60 |
| Triethylene glycol diacrylate | 10 |
| Example 3 (Sample No. 8) | |
| Vinyl chloride-vinyl acetate-maleic acid copolymer (—CO$_2$H content: $5 \times 10^{-4}$ equivalent per 1 g copolymer) | 50 |
| Urethane acrylate of Reference Example 3 | 40 |
| Trimethylolmethane triacrylate | 10 |
| Example 4 (Sample No. 9) | |
| Cellulose dinitrate | 40 |
| Urethane acrylate of Reference Example 4 | 50 |
| Trimethylolmethane triacrylate | 10 |
| Example 5 (Sample No. 10) | |
| Vinyl chloride-vinyl acetate-maleic acid copolymer of Example 3 | 60 |
| Urethane acrylate of Reference Example 5 | 35 |
| Tetramethylolmethane tetraacrylate | 5 |
| Example 6 (Sample No. 11) | |
| Vinyl chloride-vinyl acetate-maleic acid copolymer of Example 1 | 50 |
| Urethane acrylate of Reference Example 6 | 40 |
| Trimethylolmethane triacrylate | 10 |
| Example 7 (Sample No. 12) | |
| Vinyl chloride-vinyl acetate-maleic acid copolymer of Example 1 | 62 |
| Urethane acrylate of Reference Example 7 | 30 |
| 2,2'-Bis(4-acryloyloxydiethoxyphenyl)propane | 8 |

Video sensitivities, video signals to noise ratios (video S/N ratios) and still duration time of the above-described samples were measured, and storage stabilities of the magnetic coating compositions were also examined.

As for the video sensitivity and the video S/N ratio, the data for the respective samples were determined by recording 50% set-up gray signals using a video tape recorder (model NV-8200, made by Matsushita Electric Industrial Co., Ltd.), and measuring noise using a S/N meter (model 925-C, made by Shibasoku Co.). Both the video sensitivity and the video S/N ratio set forth in Table 2 are relative values evaluated taking those of Sample No. 1 as 0 dB. On the other hand, the still duration time was obtained by recording a prescribed video signal on each video tape (each sample) using a video tape recorder (model HR-3600, made by Victor Company of Japan, Limited), reproducing the still image, and measuring the time at which the TV image underwent a change under the condition of 5° C., 65% RH.

The storage stabilities of the magnetic coating compositions were each judged by allowing each of the magnetic coating compositions to stand for 24 hours and thereafter, observing (with the naked eye) whether liquid separation had occurred or not.

Magnetic coating compositions which had caused liquid separation are represented by a cross, and those which had not yet caused liquid separation are represented by a circle. The results are summarized in Table 2. As can be seen from Table 2, the present invention alone can provide magnetic coating compositions having high storage stability, and tapes execellent in electromagnetic properties and durability.

TABLE 1

| Sample No. | Video Sensitivity (dB) | Video S/N (dB) | Still Duration Time (min.) | Storage Stability |
| --- | --- | --- | --- | --- |
| 1 | +0.0 | +0.0 | more than 120 | |
| 2 | −2 | −1.8 | 45 | X |
| 3 | −2.5 | −2.0 | 45 | X |
| 4 | −3 | −1.5 | 15 | X |
| 5 | −3 | −2.0 | 3 | X |
| 6 | −3 | −1.5 | 60 | |
| 7 | +0.5 | −0.2 | more than 120 | |
| 8 | −0.2 | +0.2 | more than 120 | |
| 9 | +0.1 | −0.1 | more than 120 | |
| 10 | −0.3 | +0.2 | more than 120 | |
| 11 | +0.1 | −0.2 | more than 120 | |
| 12 | −0.2 | +0.1 | more than 120 | |

While the invention has been described in detail and with reference to specific embodiments thereof, it will be apparent to one skilled in the art that various changes and modifications can be made therein without departing from the spirit and scope thereof.

What is claimed is:

1. A magnetic recording material, comprising:
a support base having thereon;
a magnetic layer comprised of ferromagnetic powder dispersed in a binder, the binder comprised of a compound selected from class (A), a compound selected from class (B) and a compound selected from class (C), the magnetic layer having been irradiated with electron beams;
class (A) consists of vinyl chloride-vinyl acetate-based copolymers containing $5 \times 10^{-5}$ to $1.7 \times 10^{-3}$ equivalents of —$CO_2H$ groups per 1 g of copolymer;
class (B) consists of urethane acrylates having two or more acryloyl groups or methacryloyl groups per molecule and a number average molecular weight in the range of 500 to 100,000, with the urethane being synthesized using a polyester polyol as a starting material which contains a polyhydric alcohol component containing 0 to 10 mole % of a polyhydric alcohol having 3 or more hydroxyl groups and a polybasic component containing 0 to 10 mole % of a polybasic acid having 3 or more carboxyl groups, wherein at least 50 mole % of the polyhydric alcohol component is selected from the group consisting of dihydric alcohols of the group (I) and/or at least 50 mole % of the polybasic component is selected from the group consisting of dibasic acids of the group (II):
group (I) consists of alkyl-substituted aliphatic dihydric alcohols, alicyclic dihydric alcohols, and dihydric alcohols made by addition of alkylene oxide to an alcohol selected from the group consisting of alicyclic dihydric alcohols and aromatic dihydric alcohols;
group (II) consisting of alicyclic dicarboxylic acids, and aromatic dicarboxylic acids;
class (C) consists of compounds having a molecular weight of 500 or less and which contain two or more acryloyl groups or methacryloyl groups per molecule, wherein the ratio of compounds of class (B) to the compounds of class (C) is in the range of form 40/60 to 95/5 by weight, wherein the ratio of compounds of class (A) to the total of the compounds of class (B) and class (C) is in the range of 30/70 to 80/20 by weight, wherein the ferromagnetic powder is dispersed in the binder in an amount of 2 to 7 parts by weight per part by weight of the binder, wherein the magnetic layer has a thickness in the range of 2 to 8 μm and wherein the magnetic layer is irradiated with electron beams having an acceleration voltage in the range of 100 kV to 1,000 kV to apply an absorption dose in the range of 0.5 to 20 megarads.

2. A magnetic recording material as claimed in claim 1, wherein the vinyl chloride-vinyl acetate-based copolymers of the class (A) contain $3 \times 10^{-4}$ to $1 \times 10^{-3}$ equivalents of —$CO_2H$ groups per 1 g of copolymer.

3. A magnetic recording material as claimed in claim 1, wherein the class (A) consists of vinyl chloride-vinyl acetate-maleic acid copolymers.

4. A magnetic recording material as claimed in claim 1, wherein the urethane acrylates are produced by the reaction of the polyester polyol, a hydroxy group-containing (meth)acrylate and a polyisocyanate.

5. A magnetic recording material as claimed in claim 1, wherein the urethane acrylates have a number average molecular weight in the range of 1,000 to 20,000.

6. A magnetic recording medium as claimed in claim 1, wherein the ratio of the compounds of class (B) to the compounds of class (C) is in the range of 50/50 to 85/15 by weight.

7. A magnetic recording material as claimed in claim 1, wherein the ratio of the compounds of class (A) to the total of the compounds of class (B) and class (C) is in the range of 40/60 to 70/30 by weight.

8. A magnetic recording material as claimed in claim 1, wherein the magnetic layer is irradiated with electron beams having acceleration voltage in the range of 150 kV to 300 kV to apply an absorption dose in the range of 3 to 15 megarad.

* * * * *